(12) United States Patent
Nahrwold et al.

(10) Patent No.: US 10,690,250 B2
(45) Date of Patent: *Jun. 23, 2020

(54) SEAL AND SEAL ASSEMBLY (71) Applicant: Carl Freudenberg KG, Weinheim (DE)

(72) Inventors: Olaf Nahrwold, Ludwigshafen (DE); Boris Traber, Hirschberg (DE); Stefan Sindlinger, Weinheim (DE); Thomas Kramer, Rimbach (DE); Frank Lauer, Fauenberg (DE); Christian Geubert, Bensheim (DE)

(73) Assignee: CARL FREUDENBERG KG, Weinheim (DE)

( * ) Notice: Subject to any disclaimer, the term of this patent is extended or adjusted under 35 U.S.C. 154(b) by 131 days.

This patent is subject to a terminal disclaimer.

(21) Appl. No.: 15/787,730

(22) Filed: Oct. 19, 2017

(65) Prior Publication Data
US 2018/0112779 A1 Apr. 26, 2018

(30) Foreign Application Priority Data
Oct. 20, 2016 (DE) ........................ 10 2016 012 552

(51) Int. Cl.
F16J 15/34 (2006.01)
F16J 15/3296 (2016.01)
F16J 15/06 (2006.01)
G01M 13/005 (2019.01)
F16J 15/3232 (2016.01)
F16J 15/3252 (2016.01)
F16J 15/3204 (2016.01)

(52) U.S. Cl.
CPC ......... F16J 15/3492 (2013.01); F16J 15/064 (2013.01); F16J 15/3296 (2013.01); G01M 13/005 (2013.01); *F16J 15/3204* (2013.01); *F16J 15/3232* (2013.01); *F16J 15/3252* (2013.01)

(58) Field of Classification Search
CPC ........ F16J 15/064; F16J 15/3296; F16J 15/56; G01M 13/005
USPC ..................... 277/317, 321, 919; 116/208
See application file for complete search history.

(56) References Cited

U.S. PATENT DOCUMENTS 2,249,141 A * 7/1941 Johnson ............... F16J 15/3212
                                                        277/575
5,246,235 A * 9/1993 Heinzen .................. F16J 15/16
                                                        116/208

(Continued)

FOREIGN PATENT DOCUMENTS

CN          1177071 A       3/1998
CN          101629631 A     1/2010
(Continued)

*Primary Examiner* — Nicholas L Foster
(74) *Attorney, Agent, or Firm* — Leydig, Voit & Mayer, Ltd.

(57) ABSTRACT

In an embodiment, the present invention provides a seal with at least one sealing lip to seal a gap between a machine component and a housing, including: a main body made from resilient material, the main body being equipped such that it is electrically conductive and is covered with a jacket made from an electrically insulating material on at least part of its outer side. The jacket is assigned to at least those regions of the main body that are in contact with the machine component and the housing.

16 Claims, 9 Drawing Sheets

(56) References Cited

U.S. PATENT DOCUMENTS

| | | | | |
|---|---|---|---|---|
| 5,540,448 | A * | 7/1996 | Heinzen | F16J 15/16 116/208 |
| 5,785,323 | A * | 7/1998 | Heinzen | F16J 15/3296 116/208 |
| 5,895,052 | A | 4/1999 | Drucktenhengst et al. | |
| 6,615,639 | B1 * | 9/2003 | Heinzen | F16J 15/16 116/208 |
| 7,086,275 | B2 * | 8/2006 | Bock | F16J 15/3296 277/317 |
| 7,405,818 | B2 * | 7/2008 | Heinzen | F16J 15/3492 116/208 |
| 7,695,647 | B2 * | 4/2010 | Smela | H01B 1/22 252/512 |
| 8,448,949 | B2 * | 5/2013 | Stewart | F16J 15/064 277/317 |
| 9,541,199 | B2 * | 1/2017 | Rust | F16J 15/064 |
| 2004/0232619 | A1 * | 11/2004 | Bock | F16J 15/3296 277/317 |
| 2006/0220498 | A1 * | 10/2006 | Kremer | G01L 1/142 310/338 |
| 2008/0042369 | A1 * | 2/2008 | Krywitsky | F16J 15/186 277/522 |
| 2009/0317028 | A1 | 12/2009 | Castleman | |
| 2012/0119448 | A1 * | 5/2012 | Stewart | F16J 15/064 277/650 |
| 2012/0267858 | A1 * | 10/2012 | Rust | F16J 15/064 277/321 |
| 2016/0186864 | A1 * | 6/2016 | vom Stein | F16J 15/3248 277/500 |
| 2019/0072183 | A1 * | 3/2019 | Nahrwold | F16J 15/3296 |

FOREIGN PATENT DOCUMENTS

| | | |
|---|---|---|
| DE | 102006001131 A1 | 8/2006 |
| DE | 102007007405 B4 | 8/2008 |
| DE | 102008053710 A1 | 5/2010 |
| GB | 2451700 A | 2/2009 |
| GB | 2533275 A | 6/2016 |

* cited by examiner

SEAL AND SEAL ASSEMBLY

CROSS-REFERENCE TO PRIOR APPLICATION

Priority is claimed to German Patent Application No. DE 10 2016 012 552.7, filed on Oct. 20, 2016, the entire disclosure of which is hereby incorporated by reference herein.

FIELD

The invention relates to a seal with at least one sealing lip to seal the gap between a machine component and a housing, comprising a main body made from resilient material. The invention also relates to a seal assembly to seal a gap between a machine component and a housing, comprising at least one seal. The invention also relates to a method for monitoring a seal assembly.

BACKGROUND

Seals, especially seals that are subject to dynamic loads, experience wear over their predicted lifecycle in the form of a variety of wear phenomena. The seal contact stress is reduced due to material fatigue and the contact pressure force also declines. The dimensions of the seal change as a result of wear and setting behavior. These processes lead to leaks in the first instance and ultimately cause the seal system to fail.

The possibility of incorporating a leak monitoring device in the seal to monitor leaks from seals is already known in the art. DE 10 2007 007 405 B4 discloses an electrical device for detecting the state of wear of a dynamic seal element. The seal element comprises an electrically conductive section and an electrically non-conductive section, which is in contact with the machine component to be sealed. The machine component is also electrically conductive. The electrically non-conductive sealing material becomes worn due to wear on the seal element, causing the electrically conductive sealing material to come into contact with the machine component. This closes an electric circuit, making it clear that the seal element is worn. The disadvantage of this embodiment is that it is not possible to detect gradual changes in the seal condition. It is only possible to establish that the limit of wear has been reached and that the seal element must be replaced.

SUMMARY

In an embodiment, the present invention provides a seal with at least one sealing lip to seal a gap between a machine component and a housing, comprising: a main body comprising resilient material, the main body being configured such that it is electrically conductive and is covered with a jacket comprising an electrically insulating material on at least part of its outer side, wherein the jacket is assigned to at least those regions of the main body that are in contact with the machine component and the housing.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In order to achieve the object of the invention, the main body of the seal is equipped in such a way that it is electrically conductive and is covered with a jacket made from electrically insulating material on at least part of its outer side. The jacket also follows the outer contour of the main body in this case. The jacket is relatively thin and lies flat against the main body in this case. The measurement principle is based on the fact that an electric voltage is applied between the main body of the seal and the machine component or between the main body of the seal and the housing, and the capacitance between the components is determined. Key factors influencing the electrical capacitance include the electricity constant of the insulating medium, i.e. the jacket in this case, and the surface area of the main body in relation to the machine component, and the distance between the machine component and the main body. If the thickness of the jacket changes as the amount of wear increases, this also changes the electrical capacitance between these elements, and this can be detected by an appropriate electronic evaluation system. The electronic evaluation system may comprise a capacitance meter, a memory and an output, such as lights, a printer or a screen display, for example. Even gradual changes and gradual wear can be detected by such an embodiment. This allows permanent monitoring of the condition of the seal, the seal assembly and the sealing function. Due to permanent monitoring of the condition, it is possible to receive an early warning before the seal fails and thus avoid leakages from the seal assembly. The embodiment of a seal according to the invention can be applied to all sealing systems that are subject to wear as a result of dynamic loading. This invention is also advantageous compared with a wear-sensing system based on short-circuit measurement. In this case, the dimensions of the sealing system must be adjusted very accurately to changes in dimensions over time. This means that the signal is once again only generated just before a leak. However, the seal may be fitted differently in each and every system, e.g. different dimensions or different compression factors, with the result that each system must be adjusted very specifically to any other system as otherwise leaks might occur before a signal is generated. The advantageous feature of the invention is that it is not necessary to adjust the seal to changing dimensions; instead, the sealing system can be calibrated to adapt to many different applications by measuring the capacitance.

The jacket may be assigned to at least those regions of the main body that are in contact with the machine component and the housing. In this case, the jacket may completely surround the outer circumference of the main body. In other embodiments, regions of the main body may also remain uncovered. This may conceivably include those regions pointing in the direction of the sealing gap and which are neither in contact with the machine component nor with the housing. The jacket is preferably connected to the main body in a material-uniting manner.

The main body may consist of an elastomer material. Depending on the purpose of the seal, tried and tested seal materials such as NR, EPDM, EVM, ECO, CR, NBR, XNBR, ACM, AEM, HNBR, XHNBR, FKM and FFKM, and blends of these materials, may in particular be considered in this case. In addition, thermoplastic elastomers and thermoplastics may conceivably be used as materials for the main body.

The jacket preferably consists of an elastomer, a thermoplastic material or PTFE. A jacket formed from an elastomer bonds particularly well to the main body in a material-uniting manner because of the similarity between the materials. A thermoplastic material may be applied in a particularly simple manner to the main body by means of injection molding and bonds to the main body in a material-uniting manner. However, bonding can also be achieved by a positive connection. In this case, it is particularly conceivable that the connection could be formed by mechanical interlocking by means of a geometric design of the main body. However, in both cases, adhesion is also achieved by means of a bonding agent. A jacket made from PTFE has a particularly low static friction coefficient and high chemical resistance. In addition, a jacket made from PTFE is also particularly wear-resistant. A bonding agent is sometimes used to bond the jacket made from PTFE to the main body. A positive connection is also conceivable in this case. In any event, it is important that the material of the jacket is electrically insulating, while the material of the main body is electrically conductive.

The resilient material may be furnished with electrically conductive particles. In this respect, it is particularly conceivable that carbon particles or metal particles might be mixed in with the resilient material. Carbon particles include conductive carbon black, graphite, carbon fibers or carbon nanotubes, for example. Metal particles may, for example, include stainless steel fibers, metallic fibers, metal powder, coated metal powder, such as, for example, silver-coated copper flakes. The metal particles may also be aluminum or iron oxide. Both carbon particles and metal particles are electrically conductive and mean that all of the resilient material of the main body is electrically conductive.

The main body may be furnished with a contact element to establish electrical contact. In this case, the contact element is preferably designed such as to provide a secure electrical contact with the main body and to ensure that there is as little resistance in the contact as possible. In this context, it is particularly conceivable for the contact element to be designed as a plate and to lie flat against the main body. In this case, the contact element is preferably applied in the region of the main body which is assigned to the gap between the housing and the machine component when the seal is fitted and does not come into contact with the housing or the machine component. Alternatively, the contact element may also be designed as a cup spring.

A seal assembly according to the invention to seal a gap between a machine component and a housing comprises at least one seal and an electronic evaluation system to record the electrical capacitance between the main body of the seal and the machine component or the housing, or in other words the capacitance of the jacket of the seal in the vicinity of the sealing point. The electronic evaluation system may comprise a capacitance meter, a memory, and an output device, such as a screen display, for example.

According to the invention, at least the machine component or the housing should be electrically conductive. The decision as to whether the machine component or the housing must be electrically conductive depends on whether the seal is applied to the housing or to the machine component. If the seal is applied to the housing, the machine component must be conductive. If the seal is applied to the machine component, the housing must be conductive. The other component in each case can also be conductive in this situation. To monitor the condition of the seal, and in particular wear on the seal, an electric voltage is applied between the machine component or the housing and the main body of the seal such that the electrical capacitance can be determined. This is recorded by the electronic evaluation system. Furthermore, the electronic evaluation system can also record gradual changes in electrical capacitance, i.e. so-called capacitance drift. Changes in electrical capacitance come about as a result of changes in dimensions due to wear on the jacket, for example.

If the electronic evaluation system evaluates a trendline in capacitance, i.e. a capacitance tendency it is possible to predict when predefined limits will be reached.

The electronic evaluation system can also determine the degree of change in capacitance, in other words the first time derivative of the capacitance, and can incorporate this in the evaluation. In other words, it can issue a warning if the capacitance increases sharply, for example.

The methods described above make it possible to advantageously monitor the condition of the seal assembly on a permanent basis and to allow longer-term planning of maintenance operations.

Measuring capacitance and drawing conclusions as to the condition of the seal, in particular wear on the seal, offer the advantage that this can be designed as a relative measurement. In other words, the capacitance of a new seal is measured on assembly and a limit value is established in relation to this capacitance value to indicate the point at which wear will become unacceptable. Alternatively, saved limit values can be calibrated as a function of the initial measured capacitance value. Since there is no predefined absolute limit value in either case, tolerances are permitted in the characteristics of the jacket, e.g. its thickness, when the jacket of the seal is manufactured.

In the electronic evaluation system, defined values relating to the condition of the seal, and particularly wear values, are assigned to defined capacitance values in a memory. The saved values may be determined on an experimental and/or calculated basis.

A leak may be caused not only by wear, but also by ageing of the seal material. This leak then arises due to a change in the insulating layer. In particular, this may occur if the media to be sealed cause the seal material to age as a result of chemical changes. Material ageing can also manifest itself in a modified setting behavior of the seal, which can also lead to a leak under certain circumstances. Such ageing processes can also be measured in an advantageous embodiment of the seal assembly in which the electronic evaluation system uses dielectric spectroscopy for this purpose. Dielectric spectroscopy is a method covered by impedance spectroscopy and it records the dielectric properties of a material, specifically the insulating layer in this particular case. In this process, the impedance, i.e. the AC resistance of the material, is defined as a function of frequency. Impedance is a measure of material ageing.

Alternatively or in addition to merely measuring capacitance, the invention may also include the option to monitor the dielectric properties of the material by varying the frequency and to thus obtain more in-depth information on the material condition. The charge carriers D in the material are displaced by applying the electrical field E. Their intensity is determined by the dielectric constant or permittivity ε of the material.

$$D = \varepsilon \varepsilon_0 E$$

When using an alternating field, ε is a complex variable and is also known as complex permittivity $\varepsilon^*$. Like all complex variables, $\varepsilon^*$ consists of a real and an imaginary part, where the real part is referred to as $\varepsilon'$ and refers to the dielectric response component which is in phase with the applied field, while $\varepsilon''$ represents the imaginary part, which is not in phase.

The dielectric properties of a material are directly linked to the material structure and thus also to the underlying processes which cause the material's dielectric response. The dependence of complex dielectric permittivity $\varepsilon^*(w)$) on the angular frequency ω of the outer electrical field and on temperature and pressure can be justified by the following mechanisms:

microscopic fluctuations of molecular dipoles movement of mobile charge carriers (diffusion of electrons or ions)

charge separation at boundary areas, leading to additional polarization

This latter phenomenon may also occur at inner boundary areas in the mesoscale region (Maxwell/Wagner/Sillars polarization) and/or macroscopically at the contact point between the sample and the outer electrodes. The contribution of polarization may exceed the effects caused by molecular mechanisms by several orders of magnitude in this case.

In each of the described processes the real and imaginary part of the complex dielectric function have a specific temperature and frequency dependence and can therefore be used to improve the way in which the current molecular condition of the material is characterized. This additional information may provide useful information on the structure and layout of the molecular system.

In the described method the applied voltage should be as low as possible, but the frequency range is varied. The real and imaginary parts of the complex dielectric function are recorded, but in a different embodiment the dielectric module M may also be used as a characteristic variable. Changes in measurement variables may clearly be assigned to structural changes by detailed evaluation using the model functions known to persons skilled in the art (e.g. Cole-Cole, Havriliak-Negami).

The seal assembly may also comprise a support body in an advantageous embodiment, said support body being formed from an electrically insulating material. In this context, it is particularly conceivable for the support body to consist of a thermoplastic plastics material. On the one hand, the support body supports the main body in the construction area and on the other hand, it prevents regions of the main body which are not covered by the jacket coming into contact with the housing and/or machine component.

The support body is preferably furnished with a device to create an electrical connection between the contact element and an electronic evaluation system. In this case, an electrical connection is established on the one hand with the contact elements of the main body, which can be achieved by a non-positive application of an electrically conductive section of the support body, and on the other hand with the electronic evaluation system. To this end, the support body may, for example, be furnished with contact terminals, which allow simple connection to cable lugs on a cable.

In an advantageous embodiment of the invention, the seal assembly comprises two seals which are each assigned to an axial end face of the support body such that the seal assembly is able to seal bidirectionally. Such a seal assembly is particularly advantageous if the seal assembly is a rod seal. In this case, the housing may, for example, be a cylinder housing and the rod may be a piston. The seal assembly seals the gap which is filled with a medium. The choice of medium is dependent on the respective application and may include lubricant media such as transmission fluids and hydraulic fluids. However, media from the food industry are also conceivable, particularly media known from the field of filling technology such as milk, lemonade, beer, and cleaning media for said media, so-called CIP/SIP cleaning media.

However, the seal assembly according to the invention with permanent condition monitoring and leak monitoring is generally advantageous in all dynamic sealing systems with a shaped sealing lip. This specifically includes seals which comprise at least one defined sealing lip, as in the case of radial shaft seals. However, the seal may also be in the form of a profile seal, butterfly valve seal or X-ring.

The invention also relates to a method for monitoring a seal assembly as described above, said method comprising the following steps:

Capacitance is measured in a first step, either between the main body and the machine component or between the main body and the housing, depending on the structure of the seal assembly, by using a capacitance meter. The measured value is then compared with at least one limit value stored in a memory. If at least one limit value is exceeded, a message is issued by means of an output device in a third step, it being possible to assign a respective message to a respective limit value. In this process, it is in particular possible to provide a first limit value at which a purchase requisition is issued to order a new seal, and a second limit value can be provided at which a replacement request is issued to replace the seal and/or a third limit value may be provided at which a shutdown request is issued to avoid total failure of the seal and potentially critical consequences.

The method may be used in the same way to carry out the measurement using dielectric spectroscopy.

The described invention and the described advantageous developments of the invention represent advantageous developments of the invention even when combined with each other—insofar as this is technologically possible.

Please refer to the dependent claims and the description of embodiments of the invention with reference to the attached figures for further advantages and advantageous embodiments of the invention in both structural and functional respects.

The invention will be explained in greater detail with the aid of the attached drawings. Corresponding components and elements are furnished with the same reference numerals in the figures. For ease of interpretation of the figures, the drawings are not shown true to scale.

Figure 1:
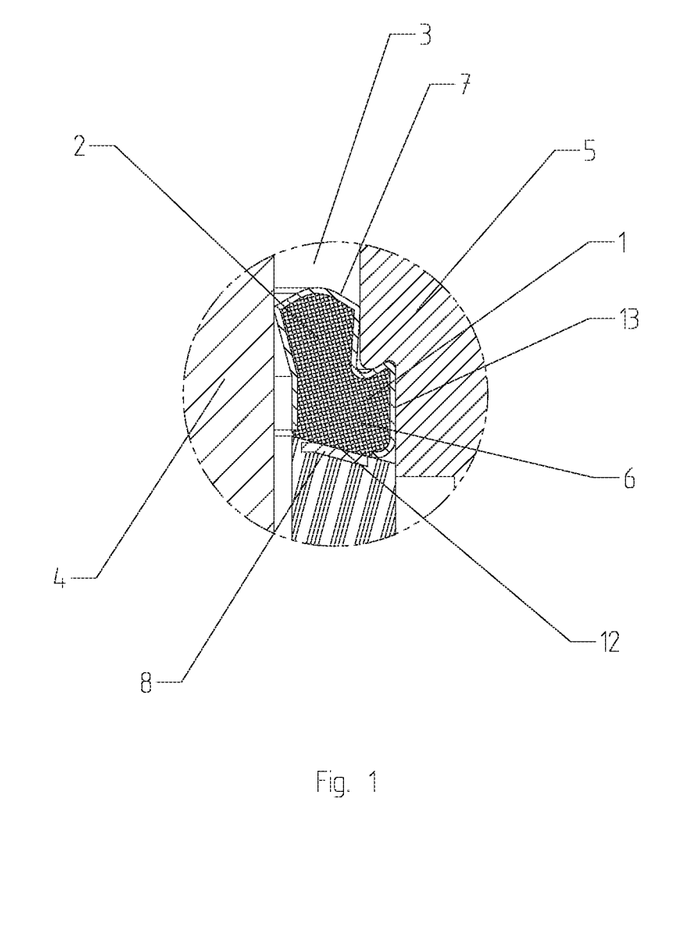
FIG. 1 shows a section through a seal.

FIG. 1 shows a seal 1 with a sealing lip 2 to seal a gap 3 between a machine component 4 and a housing 5. The sealing lip 2 lies on the machine component 4 such as to provide a seal with radial pretensioning. The seal 1 is received in a peripheral groove 13 of the housing 5 on the outer circumference and is fixed in position in the housing 5.

The seal 1 comprises a main body 6 made from resilient material, formed from an elastomer material, specifically EPDM in this embodiment. The main body 6 is furnished with electrically conductive particles in the form of carbon black such that it is electrically conductive. The specific electrical contact resistance of the main body 6 furnished with conductive particles is between 1 E+01 $\Omega \times cm^2/cm$ and 1 E+07 $\Omega \times cm^2/cm$ as defined according to DIN IEC 60093. A sample main body 6 consisting of EPDM has a contact resistance of 7.3 E+03$\Omega$ and a specific contact resistance of 7.3 E+05 $\Omega \times cm^2/cm$.

The outside of the main body 6 is coated in part with a jacket 7 made from electrically insulating material. In this embodiment, the jacket 7 is made from PTFE and is connected to the main body 6 in a material-uniting manner by means of a bonding agent. In this process the jacket 7 is assigned to those regions of the main body 6 that are in contact with the machine component 4 and the housing 5. The jacket 7 is 0.5 mm thick in this case. A thickness of between 0.01 mm and 1 mm is conceivable, preferably between 0.1 mm and 0.6 mm. A section 12 on the axial end face of the main body 6 facing the gap 3 is not covered by the jacket 7. In principle it is conceivable that the jacket 7 may be formed by a coating, for example in the form of a bonded coating, in consideration of the minimal layer thickness in the region of 0.01 mm.

The main body 6 is furnished with a contact element 8 to establish electrical contact. The contact element 8 is designed in the form of a cup spring and lies on the main body 6 on the section 12 that is not covered by the jacket 7.

Figure 2:
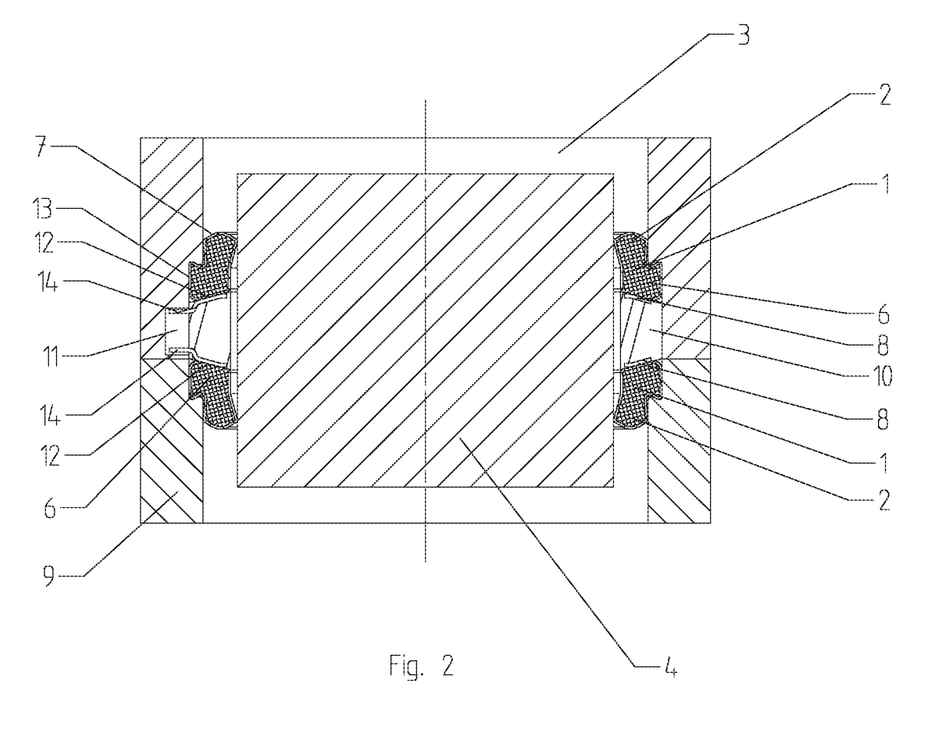
FIG. 2 shows a bidirectional seal assembly.

FIG. 2 shows a seal assembly 9 to seal a gap 3 between a machine component 4 and a housing 5. In this embodiment, the seal assembly is designed as a rod seal. The housing 5 is a cylinder housing and the machine component is a rod, or a piston respectively. The seal assembly 9 seals the gap 3 which is filled with a medium. The seal assembly 9 is designed as a bidirectional seal assembly 9 in this case and comprises two seals 1 according to FIG. 1, the sealing lips 2 pointing in opposite axial directions. The two seals 1 are supported on a support body 10 positioned in the groove 13. In this case the seals 1 are assigned to an axial end face 12 of the support body 10. The support body 10 is made from electrically insulating material.

The support body 10 is furnished with a device 11 to create an electrical connection between the contact element 8 and an electronic evaluation system. In this process, the device 11 is in electrically conductive contact with the contact element 8 and comprises connecting elements 14 in the form of contact terminals which protrude radially outwards.

The machine component 4 and at least part of the housing 5 are electrically conductive, the electronic evaluation system recording the electrical capacitance between the main body 6 and the machine component 4 and/or between the main body 6 and the housing 5.

Figure 3:
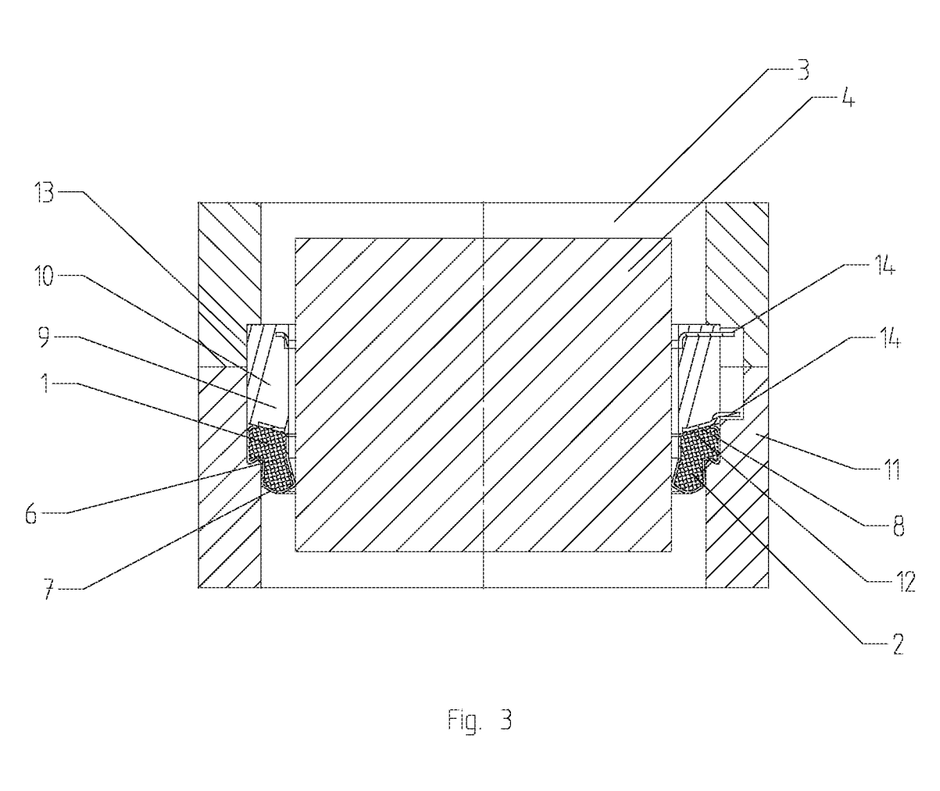
FIG. 3 shows a monodirectional seat assembly.

FIG. 3 shows the seal assembly 9 according to FIG. 2. However, only one seal 1 is provided in this embodiment, with the result that the seal assembly is a monodirectional seal assembly 9. This embodiment is particularly suited for use as a radial shaft seal.

Figure 4:
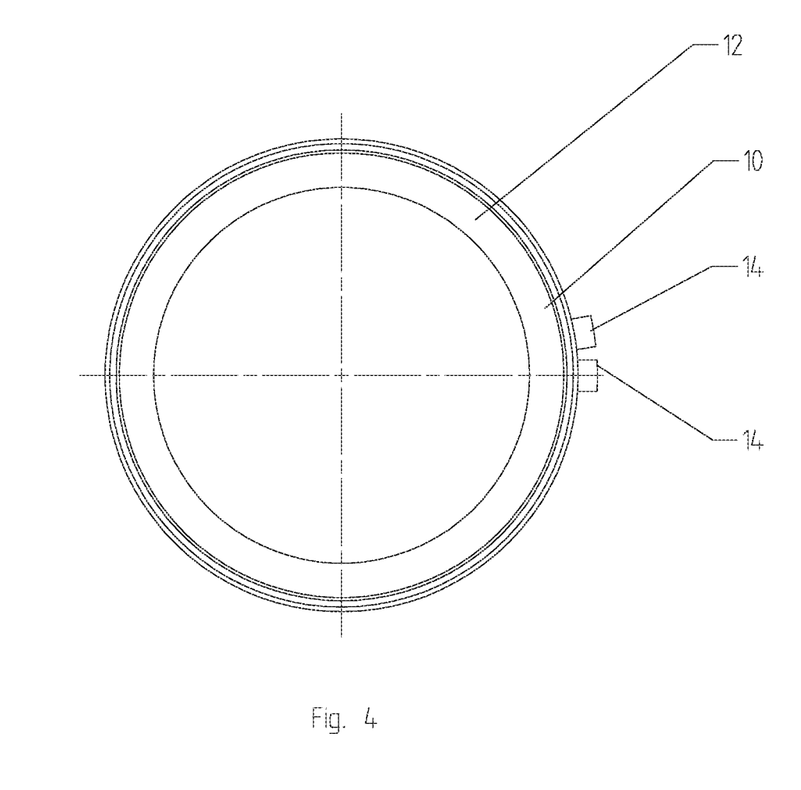
FIG. 4 shows the support body.

FIG. 4 shows a detailed view of the support body 10 with the connecting elements 14.

Figure 5:
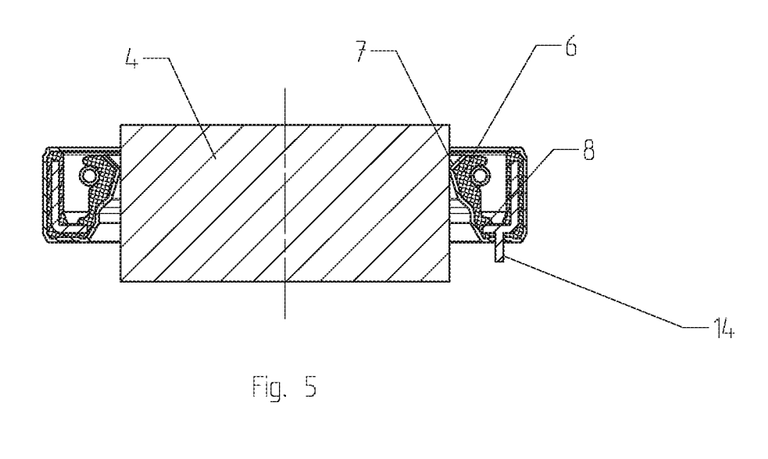
FIG. 5 shows a radial shaft seal.

In an alternative embodiment, the seal assembly 9 is a radial shaft seal 1. In this embodiment, the seal is provided around a rotating shaft. In this case the sealing lip 2 may be equipped with a jacket 7 which experiences wear over the course of its lifetime and causes the conductive main body 6 to come into contact with the shaft 4. A radial shaft seal 1 of this kind is shown in FIG. 5.

Another alternative embodiment proposes a non-elastomer sensor body comprising a jacket 7 and a main body 6 which are made from non-elastomer material. The sensor body interacts with pressure elements, for example a support O-ring, or other elastomer pressure elements which bring about a compression effect.

Figure 6:
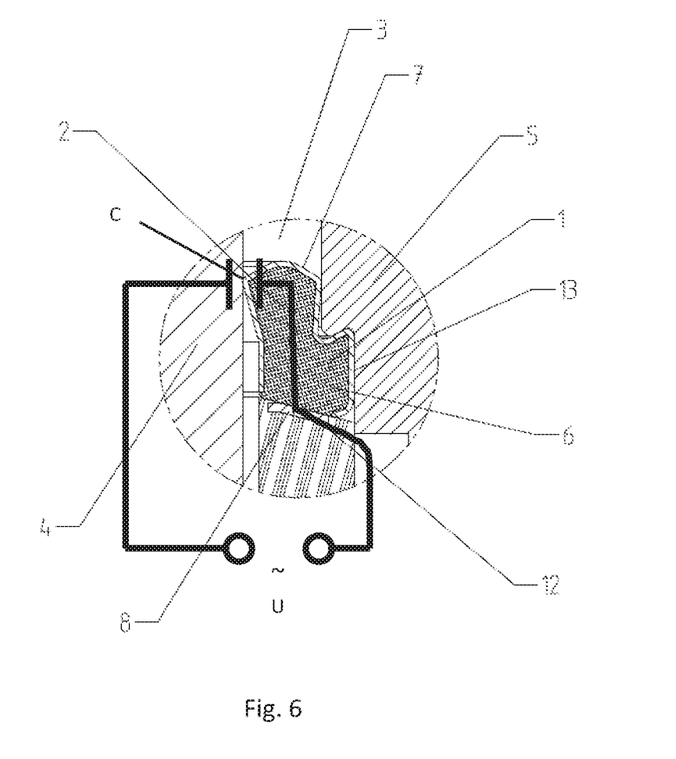
FIG. 6 shows the seal from FIG. 1 with an electronic evaluation system shown in schematic form.

FIG. 6 shows the seal from FIG. 1 with an electronic evaluation system shown in schematic form.

Figure 7:
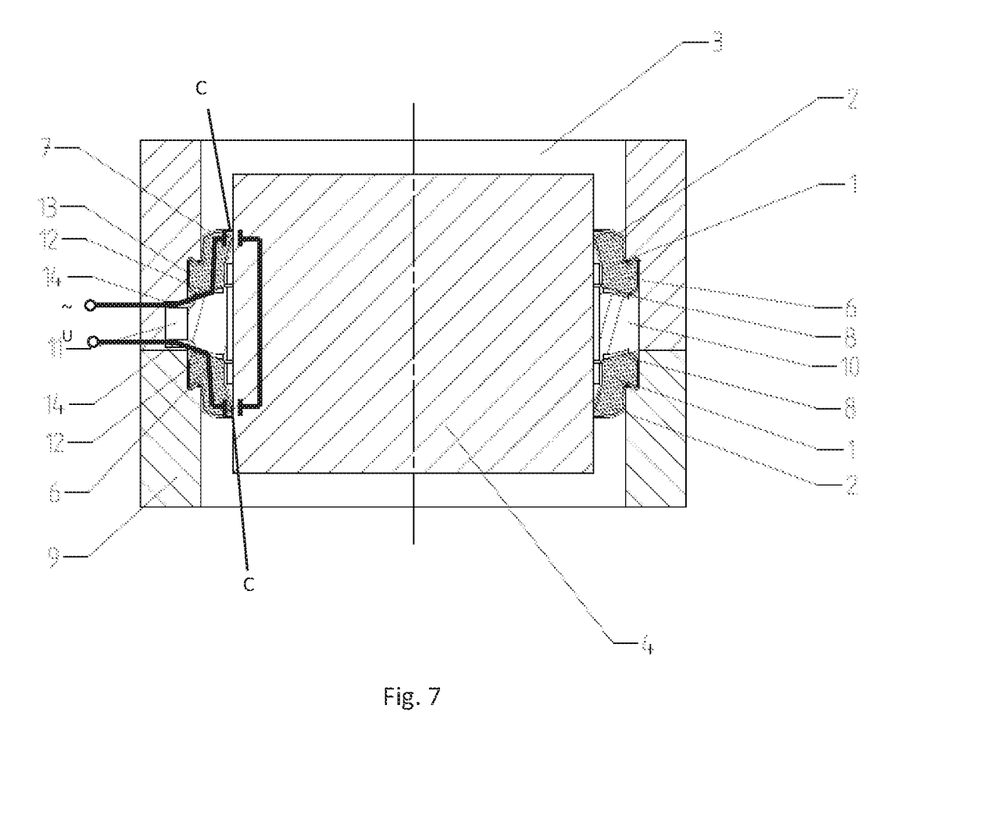
FIG. 7 shows the seal assembly from FIG. 2 with an electronic evaluation system shown in schematic form.

FIG. 7 shows the seal assembly from FIG. 2 with an electronic evaluation system shown in schematic form.

Figure 8:
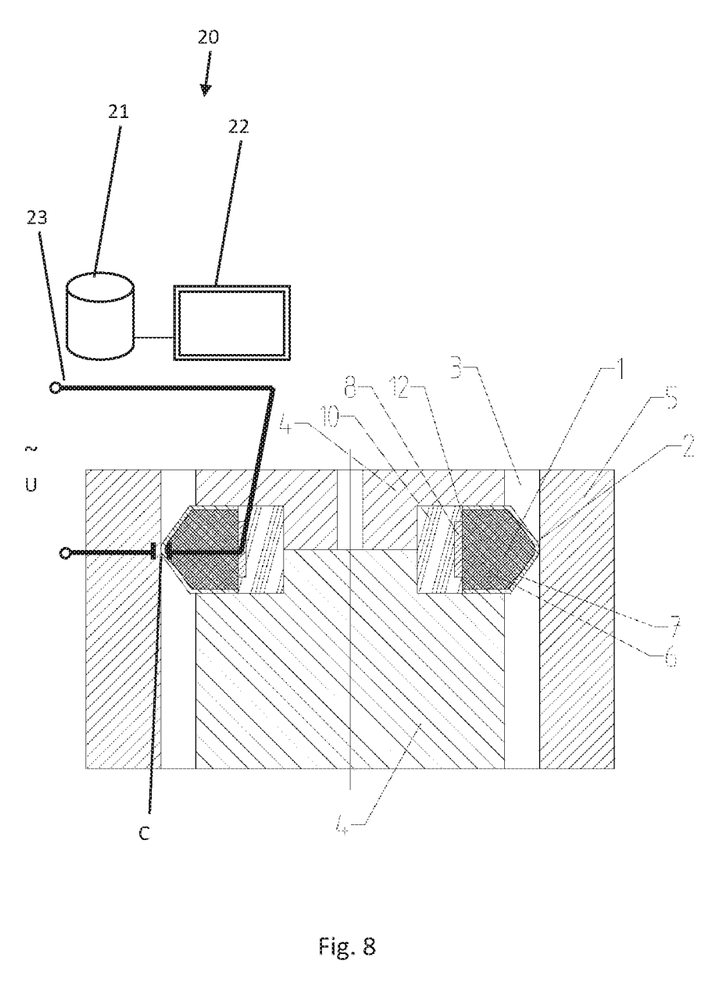
FIG. 8 shows a seal assembly with compact seal with an electronic evaluation system shown in schematic form.

FIG. 8 shows a seal 1 with a sealing lip 2 to seal a gap 3 between a machine component 4 and a housing 5. The sealing lip 2 lies on the housing 5 such that it creates a seal. The seal 1 is received in a recess of the machine component 4 on its inner circumference and is fixed in position in the machine component 4.

The seal 1 comprises a main body 6 made from resilient material and is furnished with electrically conductive particles. The outside of the main body 6 is coated in part with a jacket 7 made from electrically insulating material.

FIGS. 6 and 7 show the measurement circuit for an electronic evaluation system 20 which may be designed as in the embodiment shown in FIG. 8. The electronic evaluation system 20 comprises a capacitance meter 23 with an AC voltage source U. A alternating voltage U is applied to the seal assembly 9 and the capacitance C is calculated in the region of the sealing point. The electronic evaluation system 20 also comprises a memory 21, in which at least one limit value is saved, and an output device 22, for example colored light components such as LEDs, a printer or a screen to output information. The capacitance meter 23, memory 21 and output device 22 are connected to one another such that they can transmit data. The output device 22 may also be designed as a data connection to a server, by means of which measured values are processed and a message is sent by using generally available communication channels such as e-mail, instant messaging or apps. The message may send handling instructions to a machine operator or a machine manager, for example to order a new seal, replace the seal or to shut down the machine in which the seal assembly is used in the event of safety risks. Known applications associated with Industry 4.0 are also possible as a result of the connection to the server, e.g. automatic ordering of spare parts, automatic scheduling of maintenance calls, etc. Wear could also be compared over time with other machine data supplied by the machine in which the seal assembly is used. It would, for example, be possible to optimize the seal assembly or adapt machine operating conditions based on this kind of assessment.

Figure 9:
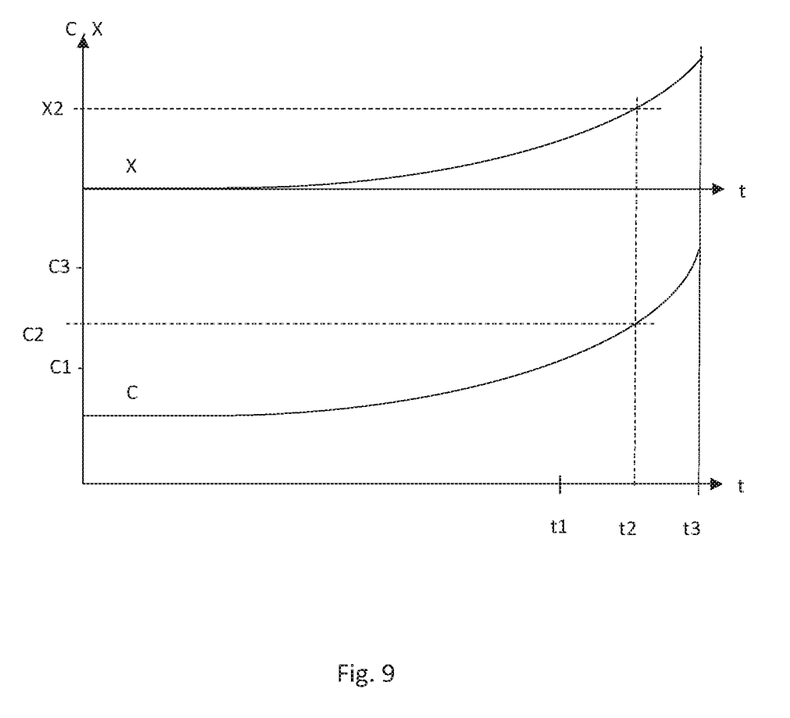
FIG. 9 shows a representation of wear and capacitance over time.

FIG. 9 shows the relationship between the capacitance C measured in a seal assembly 9 and the resulting wear X on a jacket 7 in the region of a sealing lip 2 of a seal 1 over time t. Capacitance C is plotted by the lower curve and wear X is plotted by the upper curve. Due to the direct relationship between capacitance C and wear X, it is possible to deduce the actual wear X from a measured capacitance value C.

When a new seal 1 is assembled, an initial capacitance value C is measured at time t=0. There is still no wear X at this time t=0 and thus X=0. Capacitance C can be measured continuously or quasi-continuously, i.e. with a fixed frequency. Alternatively, it may be measured at specific times $t_i$, which may be defined in advance depending on the design and purpose of the seal and the seal assembly. Each time the capacitance C is measured, the measured value is compared with limit values saved in the memory 21 of the electronic evaluation system 20. It is thus possible to define a first limit value C1, which is reached at time t1 in the example shown. After comparing the values, it is possible to issue a message to the effect that a new seal 1 needs to be ordered due to the already advanced state of wear X of the seal 1. Alternatively or in addition to merely issuing the message, a new seal 1 may also be ordered directly. At a later time t2, a second limit value C2 is reached, corresponding to a critical state of wear X2. At this advanced state of wear X2, a message may be issued to the effect that the seal 1 needs to be replaced. Alternatively or in addition to merely issuing the message, a repair order may also be issued directly to a known and designated service provider. If the seal 1 is not replaced, a third limit value C3 is reached at a later time t3, at which wear X has advanced to a highly critical and risky level. After evaluating the measured value, a message may be issued to the effect that the seal assembly 9 should no longer be used. Alternatively and/or in addition, the electronic evaluation system 20 could be shut down for its own safety. If there are still safety risks when continuing to use the seal assembly 9, the machine in which the seal assembly 9 is used could also be shut down in a controlled manner. Limit values C1 and C3 are regarded as optional. However, limit value C2 should always be present.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A seal with at least one sealing lip for sealing a gap between a machine component and a housing, the seal comprising:
    at least one sealing lip;
    a main body comprising a resilient material, the main body being electrically conductive and comprising a majority of the seal; and
    a jacket at least partially covering an outer side of the main body, the jacket comprising a relatively thin layer of an electrically insulating material,
    wherein the jacket is located at least in each region of the main body configured to contact the machine component and the housing such that the main body is configured not to contact the housing or the machine component.

2. The seal according to claim 1, wherein the main body is comprised of an elastomer material.

3. The seal according to claim 1, wherein the resilient material includes electrically conductive particles.

4. The seal according to claim 1, wherein the main body includes a contact element configured to establish electrical contact.

5. A seal assembly for sealing a gap between a machine component and a housing, comprising:
    at least one seal, the at least one seal comprising:
        at least one sealing lip;
        a main body comprising a resilient material, the main body being electrically conductive; and
        a jacket at least partially covering an outer side of the main body, the jacket comprising an electrically insulating material,
        wherein the jacket is located at least in each region of the at least one seal in contact with the machine component or the housing,
    wherein at least the machine component or at least part of the housing is electrically conductive, and
    wherein an electronic evaluation system is provided and the electronic evaluation system is configured to detect an electrical capacitance between the main body and the machine component or the housing.

6. The seal assembly according to claim 5, wherein the electronic evaluation system comprises a capacitance meter, a memory, and an output device.

7. The seal assembly according to claim 5, wherein the seal assembly comprises a support body, the support body being comprised of an electrically insulating material.

8. The seal assembly according to claim 7, wherein the support body includes a device configured to establish an electrical connection between a contact element and the electronic evaluation system.

9. The seal assembly according to claim 7, wherein the seal assembly comprises two seals, each of these seals being assigned to an axial end face of the support body such that the seal assembly is configured to seal bidirectionally.

10. The seal assembly according to claim 5, wherein the at least one seal comprises a rod seal.

11. The seal assembly according to claim 5, wherein the seal assembly is a radial shaft seal.

12. The seal assembly according to claim 10, wherein the rod seal comprises a compact rod seal.

13. A method for monitoring the seal assembly according to claim 6, the method comprising:
    a) measuring the capacitance between the main body and the machine component or the housing with the capacitance meter;
    b) comparing the measured value with at least one limit value stored in the memory; steps a) and b) being repeated at defined intervals; and
    c) issuing a message via the output device if at least one limit value is exceeded.

14. The method for monitoring the seal assembly according to claim 13, wherein the capacitance meter is calibrated before step a) is carried out for the first time.

15. The method for monitoring the seal assembly according to claim 13, wherein:
    a first limit value is provided, at which a purchasing requisition is issued in step c); or
    a second limit value is provided, at which a replacement request is issued in step c); or a third limit value is provided, at which a shutdown request is issued in step c).

16. A seal assembly comprising:

A gap between a machine component and a housing; and
at least one seal according to claim 1 located in the gap,
wherein at least the machine component or at least part of the housing is electrically conductive, and
wherein an electronic evaluation system is provided and the electronic evaluation system is configured to detect dielectric properties of the jacket using dielectric spectroscopy.

* * * * *